Figure 1:
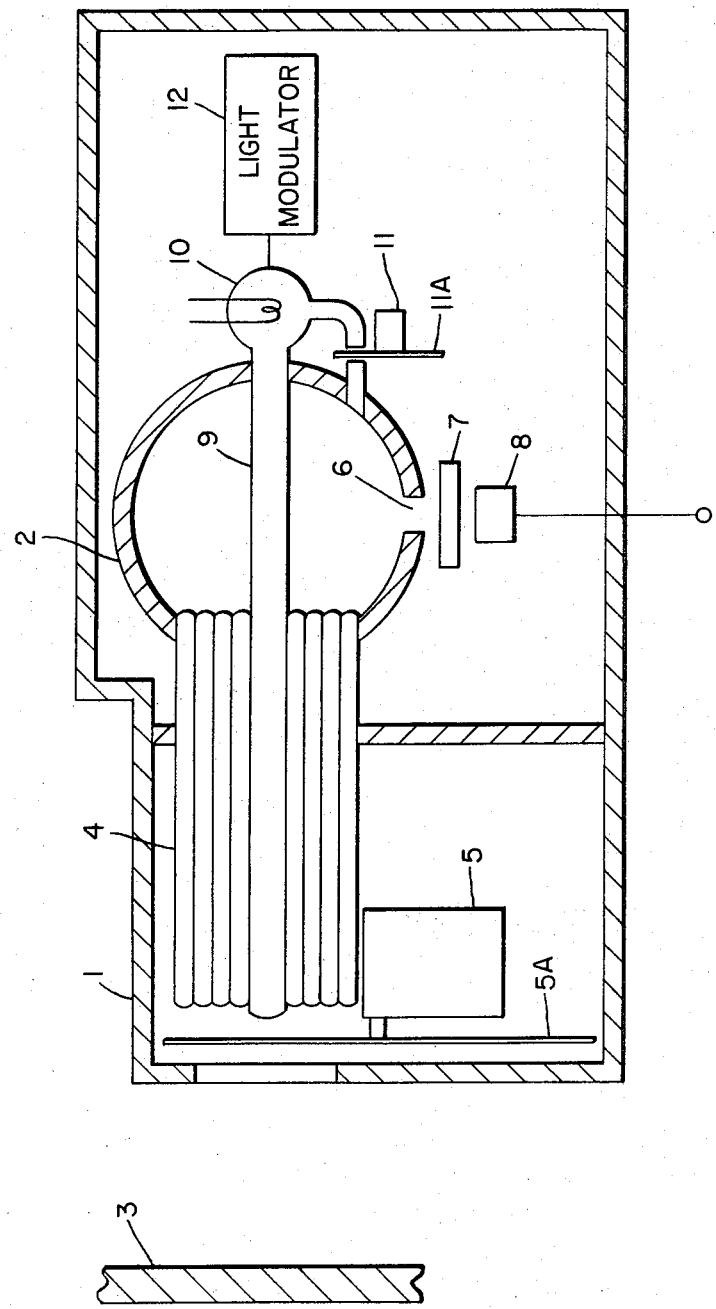

United States Patent
Aisenberg

[15] 3,698,813
[45] Oct. 17, 1972

[54] EMISSIVITY CORRECTED OPTICAL PYROMETER

[72] Inventor: Sol Aisenberg, Natick, Mass.

[73] Assignee: Whittaker Corporation, Waltham, Mass.

[22] Filed: Jan. 18, 1971

[21] Appl. No.: 106,980

[52] U.S. Cl. .................356/48, 73/355, 250/227, 250/228
[51] Int. Cl. .............................G01j 5/52, G01j 5/62
[58] Field of Search ..........356/43, 50; 250/228, 227; 73/355

[56] References Cited

UNITED STATES PATENTS

| | | | |
|---|---|---|---|
| 3,057,200 | 10/1962 | Wood | 356/43 |
| 2,439,373 | 4/1948 | Stearns, Jr. | 250/228 |

*Primary Examiner*—Ronald L. Wibert
*Assistant Examiner*—V. P. McGraw
*Attorney*—Wolf, Greenfield & Sacks and Donald E. Nist

[57] ABSTRACT

An optical pyrometer for measuring true surface temperature utilizes a spherical light integrator having a reflective internal surface. Light from the subject surface, in traveling an optical path into the spherical integrator, is modulated at a frequency $f_c$. The pyrometer employs an internal light source that is modulated at a frequency $f_L$. The modulated light from the internal source can be directed onto the subject surface to permit a measurement to be made to ascertain the reflectance of the subject surface. The reflected light from the internal source, because of its modulation $f_L$, is distinguishable from the light otherwise emanating from the subject surface which is modulated only at frequency $f_c$ in traversing the optical path to the integrator. An optical filter is employed to filter the light emerging from a port in the spherical integrator and a photo-sensitive detector is disposed to have the filtered light incident upon it.

5 Claims, 3 Drawing Figures

INVENTOR
SOL AISENBERG
BY
Wolf, Greenfield & Sacks
ATTORNEYS

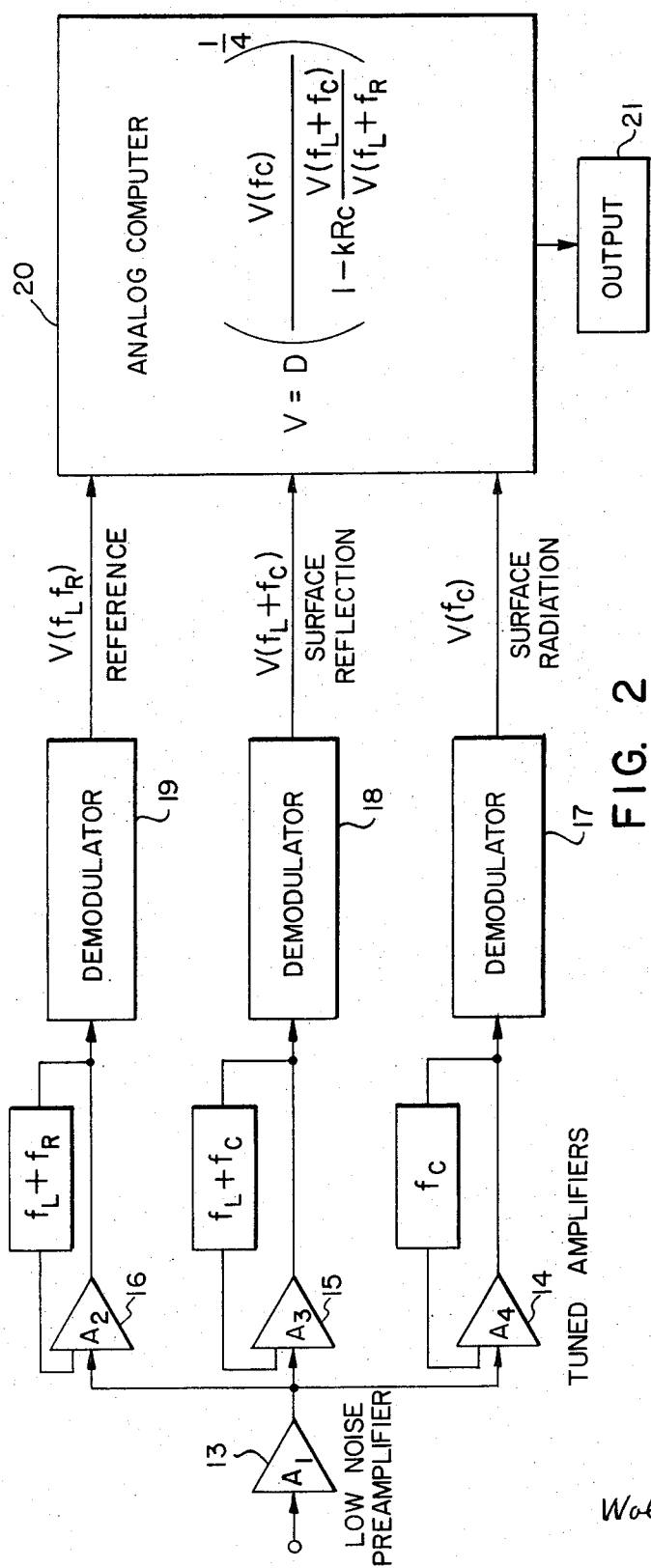
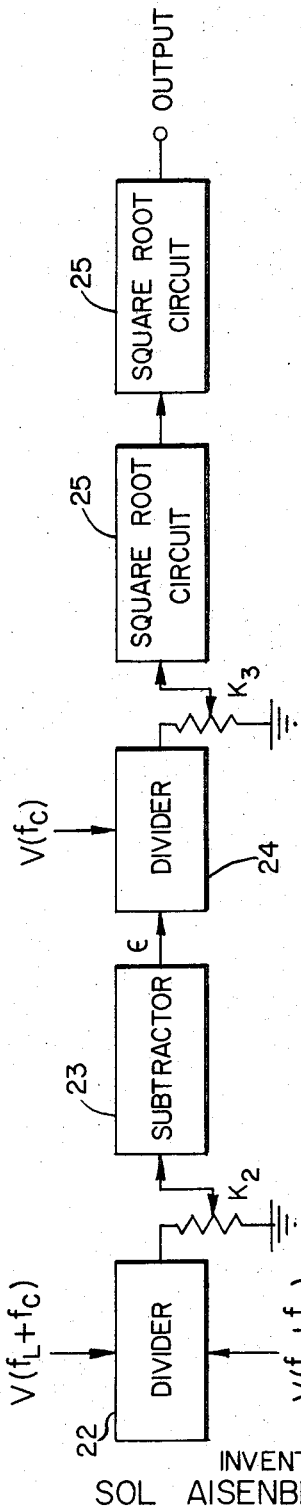
FIG. 2
FIG. 3

EMISSIVITY CORRECTED OPTICAL PYROMETER

FIELD OF THE INVENTION

The invention relates in general to apparatus for the accurate measurement of high temperature by observation of the light emitted from heated substances. More particularly, the invention pertains to an optical pyrometric device in which the true surface temperature of a hot material is ascertained by correcting for the material's surface emissivity.

BACKGROUND OF THE INVENTION

In the measurement of the true surface temperature of an incandescent material by observation of the light emitted from the material, it is known that the emissivity $\epsilon$ of the surface of the material affects its apparent brightness. To obtain the true surface temperature by optical pyrometry, it has been customary to ascertain the reflectance $R_s$ of the subject surface and to determine the surface emissivity $\epsilon$ through the relationship $\epsilon = 1 - R_s$. The apparent surface temperature is then corrected for surface emissivity. The procedures now used to ascertain true surface temperature by optical pyrometry techniques are tedious and time consuming.

OBJECTS OF THE INVENTION

The principal object of the invention is to provide optical pyrometric apparatus which facilitates the rapid determination of true surface reflectance. A further objective of the invention is to provide an optical pyrometric system capable of directly providing a measurement of true surface temperature.

THE INVENTION

The invention resides in an optical pyrometer having an internal light source and means for directing light from that source upon the subject surface. The apparent surface temperature is measured without employing the internal light source. A measurement is then made in which light from the internal source is reflected from the subject surface. The light from the internal source is modulated in a manner permitting it to be distinguished from the radiations otherwise emitted from the subject surface.

THE DRAWINGS

The invention, both as to its construction and mode of operation, can be better understood from the following exposition when it is considered in conjunction with the accompanying drawings in which:

FIG. 1 diagrammatically depicts the preferred embodiment of the invention;

FIG. 2 shows, in block diagrammatic form, the electronic portion of a system embodying the invention; and FIG. 3 is a block diagram showing a suitable form for the computer.

THE EXPOSITION

Referring now to FIG. 1 of the drawings, the preferred arrangement of the invention is shown in diagrammatic form. Situated within housing 1 is an integrating sphere 2 having a reflective internal surface. Light emitted from the surface 3 of a hot material is directed upon the reflective internal surface of the integrating sphere by a plurality of light transmitting pipes 4 which are here collectively termed the "fiber optics." The light entering the sphere from the fiber optics is integrated by the multiple reflections which occur within the sphere. The light from the hot material which passes through the aperture in housing 1 is periodically permitted to impinge upon the fiber optics by an incident light chopper 5. The incident light chopper, in a simple form, is constituted by a motor which causes an opaque plate 5A to rotate in front of the fiber optics. The plate has a plurality of slits in it which, upon rotation of the plate, periodically pass before the fiber optics to permit light to be transmitted to the integrating sphere at a frequency $f_c$.

The integrating sphere 2 has an aperture 6 in its wall which permits the integrated light to proceed to an optical filter 7. The light passing through filter 7 impinges upon a photosensitive detector 8 which emits an electrical signal in response to the light incident upon the detector. The optical filter, as is customary in the field of pyrometrics, permits only light which is within a relatively narrow band of the spectrum to impinge upon the detector.

Protruding centrally through integrating sphere 2 and the fiber optics 4 is a tube for directing light from an internal source 10 toward the heated material whose surface temperature is being ascertained. The light from source 10 is also directed into the integrating sphere, after being chopped by a reference chopper 11 which chops the light at a frequency $f_R$ that is different from the frequency $f_c$ of the incident light chopper 5. The reference chopper 11 is, in FIG. 1, indicated by an opaque disc 11A having in it a plurality of slits. The light from source 10 is controlled in intensity at a frequency $f_L$ by a modulator 12.

The signal from detector 8 is, as indicated in FIG. 2, coupled to the input of a low noise preamplifier 13. The output of preamplifier 13 is coupled to the inputs of tuned amplifiers 14, 15 and 16. Amplifier 14 is tuned to respond to signals of frequency $f_c$, amplifier 15 is tuned to respond to signals of frequency $f_L + f_c$, and amplifier 16 is tuned to respond to signals of frequency $f_L + f_R$. The tuned amplifiers 14, 15, 16 are preferably operational amplifiers and the output signals of the preamplifier is fed into the input of each of those amplifiers. The output of amplifier 14 is demodulated by a demodulator 17 to obtain a D.C. signal $V(f_c)$ whose amplitude is a measure of the surface radiation of the heated material. Similarly, the output of tuned amplifier 15 is applied to a demodulator 18 whose output is a signal $V(f_L + f_c)$ which is a measure of surface reflectance of the heated material. The output of tuned amplifier 16 is similarly demodulated by a demodulator 19 whose output provides a signal $F(f_L + f_R)$. The outputs of the demodulators are combined in a computational device, here represented as a computer 20, whose output 21 is a measure of the true surface temperature of the heated subject.

In the operation of the invention, the surface radiation of the heated subject is measured using the incident light chopper 5 to modulate the light incident upon the sphere 2 at a frequency $f_c$. The internal light source 10 is not used during this measurement. The measurement obtained, therefore, is the apparent surface temperature of the subject, uncorrected for surface emittance. The surface emittance $\epsilon$ is ascertained by measuring the surface reflectance $R_s$ of the subject, since it is known that $\epsilon = 1-R_s$. To obtain the surface reflectance $R_s$, another measurement is made in which the internal light source 10 is employed. The intensity of internal light source is modulated at frequency $f_L$ by modulator 12. The light from source 10 is directed through tube 9 and impinges at the chopping frequency $f_c$ upon the surface whose reflectance is to be ascertained. The modulated light which is reflected from the surface of the subject is, hence, chopped at frequency $f_c$. The reflected light which impinges upon detector 8, therefore, has an intermodulation frequency $f_c+f_L$, whereas the light otherwise emanating from the surface has the frequency $f_c$.

To provide for internal calibration, light from internal source 10 is chopped by the reference chopper 11 at frequency $f_R$ while the intensity of that light is modulated at frequency $f_L$ by modulator 12. The light at the intermodulation frequency $f_R+f_L$ is introduced into integrating sphere 2 and is reflected from the surface of the sphere through the aperture 6. The light is then filtered by filter 7 and impinges upon detector 8.

The reflectance $R_s$ of the subject hot surface is related to the reflectance $R_c$ of the integrating sphere by $$R_s = K_1 R_c \frac{V(f_L+f_c)}{V(f_L+f_R)}$$

where $V(f_L+f_c)$ and $V(f_L+f_R)$ are voltages proportional to the two reflected light intensities and $K_1$ is a calibration constant. This equation can be simplified to $$R_s = K_2 \frac{V(f_L+f_c)}{V(f_L+f_R)}$$

where $K_2 = K_1 R_c$ is a constant set during the calibration of the pyrometer against a standard.

From the signal voltage $V(f_c)$ which is proportional to surface reflectance, and the internal calibration reflectance signal voltage $V(f_L+f_R)$, the true surface temperature $T_s$ can be calculated from the function $$T_s = K_3 \left[ \frac{V(f_c)}{1 - K_2 \frac{V(f_L+f_c)}{V(f_L+f_R)}} \right]^{1/4}$$

Since $$\epsilon = 1 - R_s$$

$$R_s = K_2 \frac{V(f_L+f_c)}{V(f_L+f_R)}$$

and $$T_s = K_3 \left[ \frac{V(f_c)}{\epsilon} \right]^{1/4}$$

where $K_3$ is a constant.

The computer for calculating the function $T_s$ can, in a simple form, be represented by the arrangement of FIG. 3 which employs a division circuit 22 having as its inputs the signals $V(f_L+f_c)$, $V(f_L+f_R)$ and having the calibration constant $K_2$ preset by a potentiometer. The output of circuit 22 is fed into a subtraction circuit 23 to obtain a signal representing the surface emittance $\epsilon$.

The $\epsilon$ signal and the signal $V(f_c)$ are applied to a division circuit 24 having the calibration constant $K_3$ preset by a potentiometer. The output of the circuit 24 is applied to two cascaded square-root circuits 25, 26 to obtain a signal representing the true surface temperature $T_s$.

The sources of error in the function $$T_s = K_3 \left[ \frac{V(f_c)}{\epsilon} \right]^{1/4}$$

are related to the radiation from the source $K_3{}^4 V(f_c)$ and the determination of the surface emittance $\epsilon$. The fractional error $\delta\epsilon/\epsilon$ in the emittance is related to the fractional error in the reflectance $\delta R_s/R_s$ by $$\frac{\delta\epsilon}{\delta} = \frac{\delta R_s}{R_s} \cdot \frac{R_s}{R_s - 1}$$

Assuming a reflectance of about 90 percent, a 1 percent error in $R_s$, results in a 9 percent error in $\epsilon$, since $$\frac{R_s}{1-R_s} = \frac{0.0}{0.1} = 9$$

The error in reflectance is produced by an error in the ratio $$\frac{V(f_L+f_c)}{V(f_L+f_R)}$$

and by an error in the internal reflectance $R_c$. If the error in $R_c$ is about 1 percent, then the r.m.s. error in $R_s$ is 1.4 percent. The corresponding error in $\epsilon$ is 12.6 percent. Upon taking the fourth root, the contribution to the error in $T_s$ is about 1.9 percent. To this error must be conjoined the expected error in $[V(f_c)]$, which, by careful control can be held to about 1 percent. Thus, an r.m.s. error in $T_s$ of between 2 percent and 3 percent can be expected.

In view of the numerous forms which embodiments of the invention can take, it is not intended that the scope of the invention be restricted to the precise structure and arrangement illustrated in the drawings or described in the exposition. For example, the optical system, illustrated in the FIG. 1 embodiment, which directs the light from the emitting surface to the integrating sphere, can be replaced by a lens system or collimating tube to perform the same function. Further, the mechanical light chopping devices can be replaced by other types of shutters or light modulating devices. It is intended, therefore, that the scope of the invention be delimited by the claims appended hereto and that within that scope be included only those structures which in essence utilize the invention.

What is claimed is:

1. A pyrometer for measuring the true surface temperature of a subject surface, the pyrometer comprising a light integrator having a reflective internal surface;

means providing an optical path from the subject surface to the reflective internal surface of the integrator;

means for modulating at a frequency $f_c$ light propagating along the optical path;

an internal light source;

means for modulating the internal light source at a frequency $f_L$;

means for directing light from the internal source modulated at frequency $f_L$ upon the subject surface whereby reflections of that light travel along said optical path to the internal surface of the integrator;

an optical filter disposed to filter the light emerging from a port in the integrator;

and a photo-sensitive detector disposed to have the filtered light incident upon it.

2. The pyrometer according to claim 1, further comprising means for modulating at a frequency $f_R$ light from the internal source; and means for causing light from the internal source which has been modulated at frequencies $f_L + f_R$ to impinge upon the reflective internal surface of the integrator.

3. The pyrometer according to claim 2, further comprising a first amplifier tuned to respond to signals of frequency $f_c$, a second amplifier tuned to respond to signals of frequency $f_L+f_c$, a third amplifier tuned to respond to signals of frequency $f_L+f_R$, and means for coupling the signal output of the photo-sensitive detector to the input of the first, second and third amplifiers.

4. The pyrometer according to claim 3, further comprising demodulators coupled to the outputs of the first, second and third amplifiers for demodulating the outputs of the amplifiers, the demodulators providing the outputs $V(f_c)$, $V(f_L+f_c)$ and $V(f_L+f_R)$.

5. The pyrometer according to claim 4, further comprising computational apparatus responsive to the outputs of the demodulators, the computation apparatus providing an output representing the true surface temperature $T_s$ of the subject surface according to the function $$T_s = K_3 \left[ \frac{V(f_c)}{1 - K_2 \frac{V(f_L+f_c)}{V(f_L+f_R)}} \right]^{1/4}$$

where $K_2$ and $K_3$ are constants.

* * * * *